(12) United States Patent
Krüger et al.

(10) Patent No.: US 11,045,035 B2
(45) Date of Patent: Jun. 29, 2021

(54) ADAPTER FOR A SINGLE SERVE CAPSULE

(71) Applicant: K-FEE SYSTEM GMBH, Bergisch Gladbach (DE)

(72) Inventors: Marc Krüger, Bergisch Gladbach (DE); Günter Empl, Bergisch Gladbach (DE); Marco Hanisch, Overath (DE)

(73) Assignee: K-FEE SYSTEM GMBH, Bergisch Gladbach (DE)

( * ) Notice: Subject to any disclaimer, the term of this patent is extended or adjusted under 35 U.S.C. 154(b) by 276 days.

(21) Appl. No.: 15/758,464

(22) PCT Filed: Sep. 16, 2016

(86) PCT No.: PCT/EP2016/072016
§ 371 (c)(1),
(2) Date: Mar. 8, 2018

(87) PCT Pub. No.: WO2017/046352
PCT Pub. Date: Mar. 23, 2017

(65) Prior Publication Data
US 2018/0249858 A1    Sep. 6, 2018

(30) Foreign Application Priority Data

| Sep. 18, 2015 | (DE) | .................... | 10 2015 218 023.9 |
| Oct. 2, 2015 | (DE) | .................... | 10 2015 219 147.8 |
| Dec. 1, 2015 | (DE) | .................... | 10 2015 223 919.5 |

(51) Int. Cl.
*A47J 31/06* (2006.01)
*A47J 31/40* (2006.01)
*B65D 85/804* (2006.01)

(52) U.S. Cl.
CPC ....... *A47J 31/0642* (2013.01); *A47J 31/0647* (2013.01); *A47J 31/407* (2013.01); *B65D 85/8043* (2013.01)

(58) Field of Classification Search
CPC ................ A47J 31/0642; A47J 31/3623; A47J 31/3628; A47J 31/3676; A47J 31/369; A47J 31/3695; B65D 85/8043; B65D 85/8046
See application file for complete search history.

(56) References Cited

U.S. PATENT DOCUMENTS

| 2,778,739 A | 1/1957 | Rodth |
| 3,183,096 A | 5/1965 | Hiscock |
| (Continued) | | |

FOREIGN PATENT DOCUMENTS

| AU | 2011304736 A1 | 8/2012 |
| AU | 2011281237 A1 | 2/2013 |
| (Continued) | | |

OTHER PUBLICATIONS

Rawie, Alan, "Particle Sizing—An Introduction" 2012; Silver Colloids, Edition or volume on Colloidal Silver.
(Continued)

*Primary Examiner* — Jason L Vaughan
(74) *Attorney, Agent, or Firm* — The Dobrusin Law Firm, P.C.

(57) ABSTRACT

The invention relates to an adapter comprising an interior which accommodates a single serve capsule and which has an opening at a first end for introducing the capsule into the interior and a receptacle for a pricking spike at the opposite end.

16 Claims, 11 Drawing Sheets

(56) References Cited

U.S. PATENT DOCUMENTS

| | | | |
|---|---|---|---|
| 3,631,793 A | 1/1972 | Bednartz | |
| 3,640,727 A | 2/1972 | Heusinkveld | |
| 4,298,649 A | 11/1981 | Meitner | |
| 4,534,985 A | 8/1985 | Gasau | |
| 4,540,595 A | 9/1985 | Acitelli et al. | |
| 4,644,151 A | 5/1987 | Piet | |
| 4,676,482 A | 11/1987 | Marvin et al. | |
| 4,742,645 A | 5/1988 | Johnston | |
| 4,859,337 A | 8/1989 | Woltermann | |
| 4,860,645 A | 8/1989 | Van Der Lijn et al. | |
| 4,867,993 A | 9/1989 | Nordskog | |
| 4,976,179 A | 12/1990 | Lacrouts-Cazenave | |
| 4,995,310 A | 2/1991 | Van Der Lijn et al. | |
| 5,012,629 A | 5/1991 | Rehman et al. | |
| 5,028,769 A | 7/1991 | Claypool et al. | |
| 5,108,768 A | 4/1992 | So | |
| 5,242,702 A | 9/1993 | Fond | |
| 5,243,164 A | 9/1993 | Erickson et al. | |
| 5,251,758 A | 10/1993 | Kolacek | |
| 5,285,041 A | 2/1994 | Wright | |
| 5,298,267 A | 3/1994 | Gruenbacher | |
| 5,325,765 A | 7/1994 | Sylvan et al. | |
| 5,352,765 A | 10/1994 | Drent et al. | |
| 5,460,078 A | 10/1995 | Weller | |
| 5,472,719 A | 12/1995 | Favre | |
| 5,496,573 A | 3/1996 | Tsuji et al. | |
| 5,501,945 A | 3/1996 | Kanakkanatt | |
| 5,535,765 A | 7/1996 | Takashima | |
| 5,601,716 A | 2/1997 | Heinrich et al. | |
| 5,637,850 A | 6/1997 | Honda | |
| 5,638,740 A | 6/1997 | Cai | |
| 5,649,472 A * | 7/1997 | Fond | A47J 31/0673 99/295 |
| 5,656,311 A | 8/1997 | Fond | |
| 5,672,368 A | 9/1997 | Perkins | |
| 5,677,522 A | 10/1997 | Rice et al. | |
| 5,725,261 A | 3/1998 | Rahn | |
| 5,840,189 A | 11/1998 | Sylvan et al. | |
| 5,888,549 A | 3/1999 | Buchholz et al. | |
| 5,895,672 A | 4/1999 | Cooper | |
| 5,917,165 A | 6/1999 | Platt et al. | |
| 5,941,055 A | 8/1999 | Coates | |
| 5,948,455 A | 9/1999 | Schaeffer et al. | |
| 5,980,743 A | 11/1999 | Bairischer | |
| 5,994,677 A | 11/1999 | Akerlind | |
| 6,153,026 A | 11/2000 | Michotte | |
| 6,189,438 B1 | 2/2001 | Bielfeldt et al. | |
| 6,199,780 B1 | 3/2001 | Görlitz | |
| 6,202,929 B1 | 3/2001 | Verschuur et al. | |
| 6,299,926 B1 | 10/2001 | Balakrishnan et al. | |
| 6,440,256 B1 | 8/2002 | Gordon et al. | |
| 6,451,332 B1 | 9/2002 | Tanaka et al. | |
| 6,589,577 B2 | 7/2003 | Lazaris et al. | |
| 6,598,800 B1 | 7/2003 | Schmit et al. | |
| 6,607,762 B2 | 8/2003 | Lazaris et al. | |
| 6,627,244 B2 | 9/2003 | Omura | |
| 6,645,537 B2 | 11/2003 | Sweeney et al. | |
| 6,655,260 B2 | 12/2003 | Lazaris | |
| 6,706,652 B2 | 3/2004 | Groten et al. | |
| 6,854,378 B2 * | 2/2005 | Jarisch | A47J 31/3695 99/295 |
| 6,861,086 B2 | 3/2005 | Buckingham et al. | |
| 6,880,454 B2 * | 4/2005 | Kollep | A47J 31/3695 99/295 |
| 6,948,420 B2 | 9/2005 | Kirschner et al. | |
| 6,994,879 B2 | 2/2006 | Cirigliano et al. | |
| 7,408,094 B2 | 8/2008 | Little et al. | |
| 7,444,925 B2 | 11/2008 | Mahlich | |
| 7,464,518 B2 | 12/2008 | Ansinn | |
| 7,543,527 B2 | 6/2009 | Schmed | |
| 7,552,672 B2 | 6/2009 | Schmed | |
| 7,595,870 B2 | 9/2009 | Ringlien | |
| 7,673,558 B2 | 3/2010 | Panesar et al. | |
| 7,678,451 B2 | 3/2010 | Gelissen et al. | |
| 7,685,930 B2 | 3/2010 | Mandralis et al. | |
| 7,703,381 B2 | 4/2010 | Liverani et al. | |
| 7,763,295 B2 | 7/2010 | Mayr et al. | |
| 7,815,953 B2 | 10/2010 | Mastropasqua et al. | |
| 7,935,646 B2 | 5/2011 | Viazmensky et al. | |
| 7,946,217 B2 * | 5/2011 | Favre | B65D 85/8043 99/295 |
| 7,981,451 B2 | 7/2011 | Ozanne | |
| 8,039,029 B2 | 10/2011 | Ozanne | |
| 8,039,034 B2 | 10/2011 | Ozanne | |
| 8,088,423 B2 | 1/2012 | Ohresser et al. | |
| 8,109,200 B2 | 2/2012 | Hansen | |
| 8,114,461 B2 | 2/2012 | Perlman et al. | |
| 8,163,318 B2 | 4/2012 | Ozanne et al. | |
| 8,168,908 B2 | 5/2012 | Heimann | |
| 8,257,766 B2 | 9/2012 | Yoakim et al. | |
| 8,276,639 B2 | 10/2012 | Binacchi | |
| 8,304,006 B2 * | 11/2012 | Yoakim | A47J 31/0678 426/431 |
| 8,307,754 B2 | 11/2012 | Ternite et al. | |
| 8,322,271 B2 | 12/2012 | Glucksman et al. | |
| 8,361,527 B2 | 1/2013 | Winkler et al. | |
| 8,474,368 B2 | 7/2013 | Kilber et al. | |
| 8,491,948 B2 | 7/2013 | Ozanne et al. | |
| 8,491,976 B2 | 7/2013 | Sato et al. | |
| 8,505,440 B2 | 8/2013 | Kirschner et al. | |
| 8,512,886 B2 | 8/2013 | Ozanne | |
| 8,720,320 B1 * | 5/2014 | Rivera | A47J 31/3695 99/295 |
| 8,734,881 B2 | 5/2014 | Yoakim et al. | |
| 8,747,775 B2 | 6/2014 | Sandvick | |
| 8,794,125 B1 | 8/2014 | Rivera | |
| 8,906,436 B2 | 12/2014 | Nowak | |
| 8,916,220 B2 | 12/2014 | Mahlich et al. | |
| 8,956,672 B2 | 2/2015 | Yoakim et al. | |
| 8,960,076 B2 | 2/2015 | Epars et al. | |
| 8,986,762 B2 * | 3/2015 | Eichler | B65D 85/8043 426/77 |
| 9,049,958 B2 | 6/2015 | Fischer | |
| 9,072,402 B2 * | 7/2015 | Ryser | A47J 31/369 |
| 9,079,705 B2 | 7/2015 | Digiuni | |
| 9,125,515 B2 * | 9/2015 | Aardenburg | A47J 31/0673 |
| 9,150,347 B2 | 10/2015 | Scheiber | |
| 9,204,751 B2 | 12/2015 | Peterson | |
| 9,216,854 B2 | 12/2015 | Schreiber | |
| 9,226,611 B2 | 1/2016 | Yoakim et al. | |
| 9,242,791 B2 | 1/2016 | Denisart et al. | |
| 9,271,602 B2 | 3/2016 | Beaulieu et al. | |
| 9,277,837 B2 | 3/2016 | Yoakim et al. | |
| 9,290,317 B2 | 3/2016 | Quinn et al. | |
| 9,295,278 B2 | 3/2016 | Nowak | |
| 9,357,791 B2 | 6/2016 | Fountain et al. | |
| 9,359,126 B2 | 6/2016 | Wong et al. | |
| 9,359,128 B2 | 6/2016 | Mahlich | |
| 9,392,902 B2 | 7/2016 | Parentes et al. | |
| 9,394,101 B2 | 7/2016 | Empl | |
| 9,399,546 B2 | 7/2016 | Abegglen et al. | |
| 9,409,703 B2 | 8/2016 | Krüger et al. | |
| 9,409,704 B2 | 8/2016 | Digiuni et al. | |
| 9,415,931 B2 | 8/2016 | Gerbaulet et al. | |
| 9,428,328 B2 | 8/2016 | Trombetta et al. | |
| 9,428,329 B2 | 8/2016 | Trombetta et al. | |
| 9,434,525 B2 | 9/2016 | Fabozzi et al. | |
| 9,486,108 B1 | 11/2016 | Douglas et al. | |
| 9,598,230 B2 | 3/2017 | Schmed et al. | |
| 9,603,478 B2 | 3/2017 | Deleo | |
| 9,656,798 B2 | 5/2017 | Kamerbeek et al. | |
| 9,808,112 B2 | 11/2017 | Favero et al. | |
| 9,969,546 B2 | 5/2018 | Krüger | |
| 10,004,352 B2 * | 6/2018 | Deuber | A47J 31/3695 |
| 10,004,362 B2 | 6/2018 | Yang | |
| 10,011,421 B2 | 7/2018 | Bartoli et al. | |
| 10,111,554 B2 | 10/2018 | Roberts et al. | |
| 10,342,377 B2 * | 7/2019 | Cable | B65D 85/8043 |
| 10,343,838 B2 | 7/2019 | Empl | |
| 10,376,089 B2 * | 8/2019 | Deuber | A23F 5/26 |
| 10,450,130 B2 | 10/2019 | Hansen | |
| 10,455,974 B2 | 10/2019 | Talon | |
| 10,472,165 B2 | 11/2019 | Empl | |
| 2001/0014393 A1 | 8/2001 | Groten et al. | |

(56) References Cited

U.S. PATENT DOCUMENTS

| | | |
|---|---|---|
| 2001/0038204 A1 | 11/2001 | Nojima et al. |
| 2001/0047724 A1 | 12/2001 | Lazaris |
| 2001/0048957 A1 | 12/2001 | Lazaris et al. |
| 2002/0020659 A1 | 2/2002 | Sweeney |
| 2002/0048621 A1 | 4/2002 | Boyd et al. |
| 2002/0085164 A1 | 7/2002 | Stanford-Clark |
| 2002/0088807 A1 | 7/2002 | Perkovic et al. |
| 2002/0110626 A1 | 8/2002 | Buckingham et al. |
| 2003/0005826 A1 | 1/2003 | Sargent et al. |
| 2003/0033938 A1 | 2/2003 | Halliday et al. |
| 2003/0039731 A1 | 2/2003 | Dalton et al. |
| 2003/0116029 A1* | 6/2003 | Kollep ............... A47J 31/3695 99/279 |
| 2003/0121979 A1 | 7/2003 | Haens et al. |
| 2003/0148096 A1 | 8/2003 | Groten et al. |
| 2003/0172813 A1 | 9/2003 | Schifferle |
| 2003/0217644 A1* | 11/2003 | Jarisch ............... A47J 31/3695 99/279 |
| 2003/0222089 A1 | 12/2003 | Hale |
| 2004/0005384 A1 | 1/2004 | Cai |
| 2004/0045443 A1 | 3/2004 | Lazaris et al. |
| 2004/0089158 A1 | 5/2004 | Mahlich |
| 2004/0089602 A1 | 5/2004 | Heinrich et al. |
| 2004/0115310 A1 | 6/2004 | Yoakim et al. |
| 2004/0118295 A1 | 6/2004 | Angeles |
| 2004/0142070 A1 | 7/2004 | Haen |
| 2004/0155113 A1 | 8/2004 | Urano et al. |
| 2004/0182250 A1 | 9/2004 | Halliday et al. |
| 2004/0228955 A1 | 11/2004 | Denisart et al. |
| 2004/0231521 A1* | 11/2004 | Yoakim ............... A47J 31/4467 99/275 |
| 2005/0016383 A1 | 1/2005 | Kirschner et al. |
| 2005/0045566 A1 | 3/2005 | Larkin et al. |
| 2005/0051478 A1 | 3/2005 | Karanikos et al. |
| 2005/0056153 A1 | 3/2005 | Nottingham et al. |
| 2005/0061478 A1 | 3/2005 | Huang |
| 2005/0136155 A1 | 6/2005 | Jordan et al. |
| 2005/0150390 A1 | 7/2005 | Schifferle |
| 2005/0150391 A1 | 7/2005 | Schifferle |
| 2005/0158426 A1 | 7/2005 | Hu et al. |
| 2005/0158437 A1 | 7/2005 | Itaya et al. |
| 2005/0160919 A1 | 7/2005 | Balkau |
| 2005/0166763 A1 | 8/2005 | Scarchilli et al. |
| 2005/0183581 A1 | 8/2005 | Kirschner et al. |
| 2005/0266122 A1 | 12/2005 | Franceschi |
| 2006/0010744 A1 | 1/2006 | Schumacher |
| 2006/0032427 A1 | 2/2006 | Ishii et al. |
| 2006/0065127 A1 | 3/2006 | Dalton et al. |
| 2006/0074165 A1 | 4/2006 | Gelissen et al. |
| 2006/0084344 A1 | 4/2006 | Bonneh |
| 2006/0107841 A1 | 5/2006 | Schifferle |
| 2006/0110507 A1 | 5/2006 | Yoakim et al. |
| 2006/0148968 A1 | 7/2006 | Van Duijnhoven et al. |
| 2006/0194004 A1 | 8/2006 | Niemoller et al. |
| 2006/0228447 A1 | 10/2006 | Ganesan et al. |
| 2006/0236871 A1 | 10/2006 | Ternite et al. |
| 2007/0148290 A1 | 6/2007 | Ternite et al. |
| 2007/0157821 A1 | 7/2007 | Panesar et al. |
| 2007/0181005 A1 | 8/2007 | Kirschner et al. |
| 2007/0181412 A1 | 8/2007 | Raunig |
| 2007/0203587 A1 | 8/2007 | Erlandsson et al. |
| 2007/0257118 A1 | 11/2007 | Riley et al. |
| 2008/0028946 A1 | 2/2008 | Kirschner et al. |
| 2008/0038441 A1 | 2/2008 | Kirschner |
| 2008/0050488 A1 | 2/2008 | Koeling et al. |
| 2008/0085356 A1 | 4/2008 | Colliver et al. |
| 2008/0148948 A1 | 6/2008 | Evers et al. |
| 2008/0187638 A1 | 8/2008 | Hansen |
| 2008/0224536 A1 | 10/2008 | Ternite et al. |
| 2008/0245236 A1 | 10/2008 | Ternite et al. |
| 2008/0299262 A1 | 12/2008 | Reati |
| 2008/0302251 A1 | 12/2008 | Rijskamp et al. |
| 2009/0004343 A1 | 1/2009 | Xiong et al. |
| 2009/0007793 A1 | 1/2009 | Glucksman et al. |
| 2009/0007796 A1 | 1/2009 | Ricotti |
| 2009/0092711 A1 | 4/2009 | Ninh et al. |
| 2009/0126577 A1 | 5/2009 | Ternite |
| 2009/0136626 A1 | 5/2009 | Mueller |
| 2009/0139926 A1 | 6/2009 | Hassebauck |
| 2009/0173043 A1 | 7/2009 | Bloome et al. |
| 2009/0211458 A1 | 8/2009 | Denisart et al. |
| 2009/0211713 A1 | 8/2009 | Binacchi |
| 2009/0285953 A1 | 11/2009 | Renieris |
| 2009/0289121 A1 | 11/2009 | Maeda et al. |
| 2009/0291379 A1 | 11/2009 | Oota et al. |
| 2009/0324788 A1 | 12/2009 | Roy et al. |
| 2009/0324791 A1 | 12/2009 | Ohresser et al. |
| 2010/0000667 A1 | 1/2010 | Funnell |
| 2010/0028495 A1 | 2/2010 | Novak et al. |
| 2010/0050880 A1 | 3/2010 | Suter et al. |
| 2010/0051532 A1 | 3/2010 | Wawrla et al. |
| 2010/0054532 A1 | 3/2010 | Mitte et al. |
| 2010/0078480 A1 | 4/2010 | Aker |
| 2010/0108541 A1 | 5/2010 | Degli Esposti Venturi |
| 2010/0132564 A1 | 6/2010 | Ozanne et al. |
| 2010/0178404 A1 | 7/2010 | Yoakim et al. |
| 2010/0181378 A1 | 7/2010 | Hayakawa et al. |
| 2010/0196545 A1 | 8/2010 | Buffet et al. |
| 2010/0239717 A1 | 9/2010 | Yoakim et al. |
| 2010/0239733 A1 | 9/2010 | Yoakim et al. |
| 2010/0239734 A1 | 9/2010 | Yoakim et al. |
| 2010/0260915 A1 | 10/2010 | Young |
| 2010/0263329 A1 | 10/2010 | Nash |
| 2010/0264640 A1 | 10/2010 | Lane et al. |
| 2010/0288131 A1 | 11/2010 | Kilber et al. |
| 2010/0288133 A1 | 11/2010 | Litzka et al. |
| 2010/0303964 A1 | 12/2010 | Beaulieu et al. |
| 2010/0308397 A1 | 12/2010 | Ariyoshi |
| 2011/0005399 A1 | 1/2011 | Epars et al. |
| 2011/0012291 A1 | 1/2011 | Middleton et al. |
| 2011/0020500 A1* | 1/2011 | Eichler ............... B65D 85/8043 426/84 |
| 2011/0033580 A1 | 2/2011 | Biesheuvel et al. |
| 2011/0041702 A1 | 2/2011 | Yoakim et al. |
| 2011/0064852 A1 | 3/2011 | Mann |
| 2011/0076361 A1 | 3/2011 | Peterson et al. |
| 2011/0097450 A1 | 4/2011 | Krüger |
| 2011/0142996 A1 | 6/2011 | Krüger |
| 2011/0185910 A1* | 8/2011 | Ryser ............... B65D 85/8043 99/295 |
| 2011/0186450 A1* | 8/2011 | Bonacci ............... A47J 31/369 206/219 |
| 2011/0189350 A1 | 8/2011 | Van Belleghem et al. |
| 2011/0200725 A1* | 8/2011 | Kollep ............... A47J 31/0673 426/416 |
| 2011/0212225 A1 | 9/2011 | Mariller |
| 2011/0217421 A1 | 9/2011 | Perentes et al. |
| 2011/0250333 A1 | 10/2011 | Ozanne |
| 2011/0250812 A1 | 10/2011 | Pourdeyhimi et al. |
| 2011/0303095 A1 | 12/2011 | Fu et al. |
| 2011/0308397 A1 | 12/2011 | Sinot et al. |
| 2012/0006685 A1 | 1/2012 | Van Engelen |
| 2012/0015080 A1 | 1/2012 | Roulin et al. |
| 2012/0038063 A1 | 2/2012 | Meyer et al. |
| 2012/0058226 A1 | 3/2012 | Winkler et al. |
| 2012/0060697 A1 | 3/2012 | Ozanne |
| 2012/0070542 A1 | 3/2012 | Camera et al. |
| 2012/0070543 A1 | 3/2012 | Mahlich |
| 2012/0070551 A1 | 3/2012 | Mahlich |
| 2012/0073418 A1* | 3/2012 | Aardenburg ........ A47J 31/0673 83/660 |
| 2012/0090473 A1* | 4/2012 | Deuber ............... A47J 31/3695 99/289 R |
| 2012/0097041 A1 | 4/2012 | Bucher et al. |
| 2012/0097602 A1 | 4/2012 | Tedford |
| 2012/0100264 A1 | 4/2012 | Bucher et al. |
| 2012/0109186 A1 | 5/2012 | Parrott et al. |
| 2012/0121765 A1 | 5/2012 | Kamerbeek et al. |
| 2012/0123106 A1 | 5/2012 | Joos |
| 2012/0126834 A1 | 5/2012 | Kleinhans |
| 2012/0148709 A1 | 6/2012 | Kamerbeek et al. |
| 2012/0177788 A1 | 7/2012 | Seid et al. |
| 2012/0180670 A1* | 7/2012 | Yoakim ............... B65D 85/8043 99/295 |

(56) References Cited

U.S. PATENT DOCUMENTS

| | | |
|---|---|---|
| 2012/0183657 A1 | 7/2012 | Marina et al. |
| 2012/0195155 A1 | 8/2012 | Gennai et al. |
| 2012/0201933 A1 | 8/2012 | Dran et al. |
| 2012/0207893 A1 | 8/2012 | Krüger |
| 2012/0207895 A1 | 8/2012 | Rivera |
| 2012/0251668 A1 | 10/2012 | Wong et al. |
| 2012/0251672 A1 | 10/2012 | Kamerbeek et al. |
| 2012/0251694 A1 | 10/2012 | Kamerbeek et al. |
| 2012/0258210 A1 | 10/2012 | Wong et al. |
| 2012/0295234 A1 | 11/2012 | Rognon et al. |
| 2012/0301581 A1 | 11/2012 | Abegglen et al. |
| 2012/0308688 A1 | 12/2012 | Peterson et al. |
| 2013/0055903 A1 | 3/2013 | Deuber |
| 2013/0059039 A1 | 3/2013 | Trombetta et al. |
| 2013/0064929 A1 | 3/2013 | Jarisch et al. |
| 2013/0064937 A1 | 3/2013 | Jarisch et al. |
| 2013/0084363 A1 | 4/2013 | Krueger et al. |
| 2013/0084376 A1 | 4/2013 | Fischer et al. |
| 2013/0087051 A1 | 4/2013 | Frydman |
| 2013/0099597 A1 | 4/2013 | Perentes et al. |
| 2013/0101716 A1 | 4/2013 | Beaulieu et al. |
| 2013/0122153 A1 | 5/2013 | Ferrier et al. |
| 2013/0122167 A1 | 5/2013 | Winkler et al. |
| 2013/0125762 A1 | 5/2013 | Dogan et al. |
| 2013/0129872 A1 | 5/2013 | Krueger et al. |
| 2013/0136828 A1 | 5/2013 | Anghileri |
| 2013/0149424 A1 | 6/2013 | Fischer |
| 2013/0156897 A1 | 6/2013 | Goldstein |
| 2013/0156899 A1 | 6/2013 | Quinn et al. |
| 2013/0206011 A1 | 8/2013 | Ozanne et al. |
| 2013/0209618 A1 | 8/2013 | Trombetta et al. |
| 2013/0209619 A1 | 8/2013 | Mahlich |
| 2013/0209620 A1 | 8/2013 | Ozanne et al. |
| 2013/0209622 A1 | 8/2013 | Fountain et al. |
| 2013/0216663 A1 | 8/2013 | Dogan et al. |
| 2013/0224343 A1 | 8/2013 | Tremblay |
| 2013/0230627 A1 | 9/2013 | Hansen et al. |
| 2013/0243910 A1 | 9/2013 | Krüger et al. |
| 2013/0312619 A1 | 11/2013 | Spiegel et al. |
| 2013/0323366 A1 | 12/2013 | Gerbaulet et al. |
| 2013/0327223 A1 | 12/2013 | Bartoli et al. |
| 2013/0341478 A1 | 12/2013 | Mariller |
| 2014/0001563 A1 | 1/2014 | Krueger et al. |
| 2014/0004231 A1 | 1/2014 | Norton et al. |
| 2014/0017359 A1 | 1/2014 | Krüger et al. |
| 2014/0026761 A1 | 1/2014 | Bartoli et al. |
| 2014/0127364 A1 | 5/2014 | Fu et al. |
| 2014/0141128 A1 | 5/2014 | Trombetta et al. |
| 2014/0141129 A1 | 5/2014 | Greene |
| 2014/0157993 A1 | 6/2014 | Brouwer et al. |
| 2014/0161936 A1 | 6/2014 | Trombetta et al. |
| 2014/0178538 A1 | 6/2014 | Husband et al. |
| 2014/0196608 A1 | 7/2014 | Amrein et al. |
| 2014/0220191 A1 | 8/2014 | Kelly et al. |
| 2014/0224130 A1 | 8/2014 | Castellani et al. |
| 2014/0230370 A1 | 8/2014 | Bianchi |
| 2014/0263033 A1 | 9/2014 | Fu et al. |
| 2014/0272018 A1 | 9/2014 | Koller et al. |
| 2014/0287104 A1 | 9/2014 | Austin et al. |
| 2014/0287105 A1 | 9/2014 | Husband et al. |
| 2014/0346022 A1 | 11/2014 | Keller et al. |
| 2014/0348984 A1 | 11/2014 | Zeller et al. |
| 2014/0370181 A1 | 12/2014 | Young et al. |
| 2015/0010680 A9 | 1/2015 | Mahlich |
| 2015/0020481 A1 | 1/2015 | Hodler |
| 2015/0029702 A1 | 1/2015 | Foley |
| 2015/0056331 A1 | 2/2015 | Rivera |
| 2015/0056340 A1 | 2/2015 | Trombetta et al. |
| 2015/0056351 A1 | 2/2015 | Deuber |
| 2015/0079241 A1 | 3/2015 | Mahlich |
| 2015/0119220 A1 | 4/2015 | Rea et al. |
| 2015/0128525 A1 | 5/2015 | Bartoli et al. |
| 2015/0132441 A1 | 5/2015 | Accursi |
| 2015/0157164 A1 | 6/2015 | Digiuni |
| 2015/0158665 A1 | 6/2015 | Krueger et al. |
| 2015/0158666 A1 | 6/2015 | Krüger et al. |
| 2015/0166204 A1 | 6/2015 | Rea et al. |
| 2015/0173558 A1 | 6/2015 | Cross et al. |
| 2015/0175347 A1 | 6/2015 | Empl |
| 2015/0191302 A1 | 7/2015 | Gerbaulet et al. |
| 2015/0201790 A1 | 7/2015 | Smith et al. |
| 2015/0239652 A1 | 8/2015 | Trombetta et al. |
| 2015/0239653 A1 | 8/2015 | Dogan et al. |
| 2015/0246741 A1 | 9/2015 | Hansen et al. |
| 2015/0274411 A1 | 10/2015 | Krueger |
| 2015/0297021 A1 | 10/2015 | Bugnano et al. |
| 2015/0297023 A1 | 10/2015 | Hansen et al. |
| 2015/0314954 A1 | 11/2015 | Empl |
| 2015/0329282 A1 | 11/2015 | Bartoli et al. |
| 2015/0344220 A1 | 12/2015 | Sanders |
| 2015/0353275 A1 | 12/2015 | Accursi |
| 2015/0366397 A1* | 12/2015 | Flick ............... A47J 31/3623 99/280 |
| 2015/0375926 A1 | 12/2015 | Fischer |
| 2016/0001968 A1 | 1/2016 | Krüger et al. |
| 2016/0037961 A1 | 2/2016 | Digiuni |
| 2016/0045060 A1 | 2/2016 | Flick |
| 2016/0058234 A1 | 3/2016 | Eppler et al. |
| 2016/0066591 A1 | 3/2016 | Halliday et al. |
| 2016/0075506 A1 | 3/2016 | Chapman et al. |
| 2016/0174754 A1* | 6/2016 | Flick ............... A47J 31/3628 426/394 |
| 2016/0194146 A1 | 7/2016 | Schelch et al. |
| 2016/0198888 A1* | 7/2016 | Flick ............... A47J 31/0673 99/295 |
| 2016/0198889 A1* | 7/2016 | Flick ............... A47J 31/0673 99/295 |
| 2016/0207696 A9 | 7/2016 | Trombetta et al. |
| 2016/0280453 A1 | 7/2016 | Flick et al. |
| 2016/0242594 A1 | 8/2016 | Empl et al. |
| 2016/0251150 A1 | 9/2016 | Macchi et al. |
| 2016/0255987 A1 | 9/2016 | De Graaff et al. |
| 2016/0325921 A1 | 11/2016 | Empl |
| 2016/0332759 A1 | 11/2016 | Trombetta et al. |
| 2016/0338528 A1* | 11/2016 | Yui ..................... A47J 31/465 |
| 2016/0340110 A1 | 11/2016 | Trombetta et al. |
| 2016/0367069 A1* | 12/2016 | Cable ............... A23F 5/262 |
| 2017/0008694 A1 | 1/2017 | Andreae et al. |
| 2017/0020329 A1 | 1/2017 | Douglas et al. |
| 2017/0027374 A1 | 2/2017 | Smith et al. |
| 2017/0051800 A1 | 2/2017 | Hill et al. |
| 2017/0055757 A1 | 3/2017 | Fu et al. |
| 2017/0119198 A1* | 5/2017 | Barber ............... A47J 31/407 |
| 2017/0174417 A1 | 6/2017 | Nordqvist et al. |
| 2017/0183145 A1 | 6/2017 | Cabilli et al. |
| 2017/0231421 A1 | 8/2017 | Talon |
| 2017/0362020 A1 | 12/2017 | Hanneson et al. |
| 2018/0105355 A1 | 4/2018 | Harif |
| 2018/0194545 A1 | 7/2018 | Bisio |
| 2018/0303281 A1 | 10/2018 | Carr et al. |
| 2019/0208950 A1 | 7/2019 | Wong et al. |

FOREIGN PATENT DOCUMENTS

| | | |
|---|---|---|
| AU | 2014203212 A1 | 7/2014 |
| CA | 2436389 A1 | 8/2002 |
| CA | 2327021 C | 1/2005 |
| CA | 2400033 C | 2/2005 |
| CA | 2399290 C | 1/2006 |
| CA | 2399283 C | 5/2007 |
| CA | 2661921 A1 | 3/2008 |
| CA | 2763746 A1 | 3/2010 |
| CA | 2784752 C | 6/2011 |
| CA | 2662071 C | 7/2011 |
| CA | 2538256 C | 8/2011 |
| CA | 2824135 A1 | 12/2011 |
| CA | 2805839 A1 | 1/2012 |
| CA | 2753230 A1 | 3/2012 |
| CA | 2810237 A1 | 3/2012 |
| CA | 2531544 C | 5/2012 |
| CA | 2831304 A1 | 10/2012 |
| CA | 2839293 A1 | 12/2012 |
| CA | 2662069 C | 1/2013 |

(56) References Cited

FOREIGN PATENT DOCUMENTS

| | | |
|---|---|---|
| CA | 2785843 A1 | 2/2013 |
| CA | 2788283 A1 | 3/2013 |
| CA | 2850010 A1 | 5/2013 |
| CA | 2810236 C | 7/2013 |
| CA | 2866119 A1 | 9/2013 |
| CA | 2872667 A1 | 11/2013 |
| CA | 2874025 A1 | 12/2013 |
| CA | 2874070 A1 | 12/2013 |
| CA | 2877027 A1 | 12/2013 |
| CA | 2877090 A1 | 1/2014 |
| CA | 2888129 A1 | 4/2014 |
| CA | 2888658 C | 6/2014 |
| CA | 2898173 A1 | 8/2014 |
| CA | 2902231 A1 | 8/2014 |
| CA | 2905188 A1 | 9/2014 |
| CA | 2901582 A1 | 11/2014 |
| CA | 2901664 A1 | 11/2014 |
| CA | 2922822 A1 | 2/2015 |
| CA | 2922824 A1 | 2/2015 |
| CA | 2832794 C | 3/2016 |
| CA | 2833096 C | 5/2016 |
| CN | 1444894 A | 10/2003 |
| CN | 1640350 C | 7/2005 |
| CN | 1826071 A | 8/2006 |
| CN | 1849249 A | 10/2006 |
| CN | 1942125 A | 4/2007 |
| CN | 101014513 A | 8/2007 |
| CN | 101016667 A | 8/2007 |
| CN | 101043835 A | 9/2007 |
| CN | 101090657 A | 12/2007 |
| CN | 101263066 A | 9/2008 |
| CN | 101588974 A | 11/2009 |
| CN | 101646613 A | 2/2010 |
| CN | 101686771 A | 3/2010 |
| CN | 101828840 A | 9/2010 |
| CN | 101970314 A | 2/2011 |
| CN | 101992905 A | 3/2011 |
| CN | 102365214 A | 2/2012 |
| CN | 102379630 A | 3/2012 |
| CN | 102574631 A | 7/2012 |
| CN | 102574633 A | 7/2012 |
| CN | 102741135 A | 10/2012 |
| CN | 102741136 A | 10/2012 |
| CN | 102791595 A | 11/2012 |
| CN | 102958408 A | 3/2013 |
| CN | 103025627 A | 4/2013 |
| CN | 103201197 A | 7/2013 |
| CN | 103402893 A | 11/2013 |
| CN | 103476687 A | 12/2013 |
| CN | 103501624 A | 1/2014 |
| CN | 103826506 A | 5/2014 |
| CN | 204048139 U | 12/2014 |
| CN | 104411600 A | 3/2015 |
| CN | 104603029 A | 5/2015 |
| CN | 104619607 A | 5/2015 |
| CN | 104870336 A | 8/2015 |
| DE | 1207866 B | 12/1965 |
| DE | 1221960 B | 7/1966 |
| DE | 3100115 A1 | 11/1981 |
| DE | 69615001 T2 | 3/2002 |
| DE | 102004056224 A1 | 5/2006 |
| DE | 202006003115 U1 | 5/2006 |
| DE | 102006004329 A1 | 8/2007 |
| DE | 202009014945 U1 | 9/2010 |
| DE | 202010007919 U1 | 11/2010 |
| DE | 102010027485 A1 | 1/2012 |
| DE | 102010034206 A1 | 2/2012 |
| DE | 102011012881 A1 | 3/2012 |
| DE | 202012101513 U1 | 5/2012 |
| DE | 102011010534 A1 | 8/2012 |
| DE | 102011115833 A1 | 4/2013 |
| DE | 102012105282 A1 | 12/2013 |
| DE | 102012110446 A1 | 1/2014 |
| DE | 102012109186 A1 | 3/2014 |
| DE | 102012223291 A1 | 6/2014 |
| DE | 102013215274 A1 | 8/2014 |
| DE | 102014018470 A1 | 6/2016 |
| EP | 0224297 A1 | 6/1987 |
| EP | 0244339 A1 | 11/1987 |
| EP | 0338479 A1 | 10/1989 |
| EP | 453573 A1 | 10/1991 |
| EP | 0468078 A1 | 1/1992 |
| EP | 0468079 A1 | 1/1992 |
| EP | 0656224 A1 | 6/1995 |
| EP | 0859467 A1 | 8/1998 |
| EP | 0865749 A1 | 9/1998 |
| EP | 0923865 A2 | 6/1999 |
| EP | 1118305 A2 | 7/2001 |
| EP | 1129623 A1 | 9/2001 |
| EP | 1167204 A1 | 1/2002 |
| EP | 1221418 A1 | 7/2002 |
| EP | 1263661 A1 | 12/2002 |
| EP | 1344722 A1 | 9/2003 |
| EP | 1344724 A1 | 9/2003 |
| EP | 1363501 A2 | 11/2003 |
| EP | 1471012 A2 | 10/2004 |
| EP | 1500358 A1 | 1/2005 |
| EP | 1555219 A1 | 7/2005 |
| EP | 1559351 A2 | 8/2005 |
| EP | 1566127 A2 | 8/2005 |
| EP | 1567594 A1 | 8/2005 |
| EP | 1567595 A1 | 8/2005 |
| EP | 1586534 A1 | 10/2005 |
| EP | 1710173 A1 | 10/2006 |
| EP | 1792850 B1 | 6/2007 |
| EP | 1796516 A2 | 6/2007 |
| EP | 1849718 A1 | 10/2007 |
| EP | 1882432 B1 | 1/2008 |
| EP | 1892199 A1 | 2/2008 |
| EP | 1974638 A1 | 10/2008 |
| EP | 1997748 A1 | 12/2008 |
| EP | 2158829 A1 | 3/2010 |
| EP | 1882431 B1 | 4/2010 |
| EP | 2218653 A1 | 8/2010 |
| EP | 2230195 A1 | 9/2010 |
| EP | 2239211 A1 | 10/2010 |
| EP | 2284102 A1 | 2/2011 |
| EP | 2287090 A1 | 2/2011 |
| EP | 1894499 A1 | 7/2011 |
| EP | 2345352 A1 | 7/2011 |
| EP | 2364930 A2 | 9/2011 |
| EP | 2384133 B1 | 11/2011 |
| EP | 2412645 A1 | 2/2012 |
| EP | 2412646 A1 | 2/2012 |
| EP | 2444339 A1 | 4/2012 |
| EP | 2465792 A2 | 6/2012 |
| EP | 2476633 A1 | 7/2012 |
| EP | 2484505 A2 | 8/2012 |
| EP | 2484605 A1 | 8/2012 |
| EP | 2510805 A2 | 10/2012 |
| EP | 2343247 B1 | 11/2012 |
| EP | 2537778 A1 | 12/2012 |
| EP | 2537779 A1 | 12/2012 |
| EP | 2559636 A1 | 2/2013 |
| EP | 2647317 A1 | 10/2013 |
| EP | 2720961 A1 | 4/2014 |
| EP | 2750876 A1 | 7/2014 |
| EP | 2752372 A1 | 7/2014 |
| EP | 2809006 A1 | 12/2014 |
| EP | 2909088 A1 | 8/2015 |
| EP | 2971319 A1 | 1/2016 |
| EP | 2996522 A1 | 3/2016 |
| FR | 2556323 A1 | 6/1985 |
| FR | 2912124 A1 | 8/2008 |
| FR | 2946854 A3 | 12/2010 |
| FR | 2963332 A1 | 2/2012 |
| GB | 1402799 A | 8/1975 |
| GB | 2061174 A | 5/1981 |
| GB | 2482032 A | 1/2012 |
| GB | 2485575 A | 5/2012 |
| GB | 2489409 A | 10/2012 |
| GB | 2499201 A | 8/2013 |
| JP | S6266714 A | 3/1987 |
| JP | S62-130649 A | 6/1987 |

(56) References Cited

FOREIGN PATENT DOCUMENTS

| | | |
|---|---|---|
| JP | S62-168512 A | 7/1987 |
| JP | H0-1233688 A | 9/1989 |
| JP | 02289207 A | 11/1990 |
| JP | H0394377 A | 4/1991 |
| JP | H04176311 A | 6/1992 |
| JP | H05502817 A | 5/1993 |
| JP | H06510682 A | 12/1994 |
| JP | H07107915 A | 4/1995 |
| JP | 2779653 B2 | 7/1998 |
| JP | H11342078 A | 12/1999 |
| JP | 2001-017094 A | 1/2001 |
| JP | 2001-082699 A | 3/2001 |
| JP | 2001-250161 A | 9/2001 |
| JP | 2002-274000 A | 9/2002 |
| JP | 2002-347852 A | 12/2002 |
| JP | 2003-522567 A | 7/2003 |
| JP | 2003-235733 A | 8/2003 |
| JP | 2003-265320 A | 9/2003 |
| JP | 2004-097015 A | 4/2004 |
| JP | 2004-533305 A | 11/2004 |
| JP | 2005-199070 A | 7/2005 |
| JP | 2005-199071 A | 7/2005 |
| JP | 2006-510682 A | 3/2006 |
| JP | 2006-528497 A | 12/2006 |
| JP | 2007-522856 A | 8/2007 |
| JP | 2007-530107 A | 11/2007 |
| JP | 2008-054840 A | 3/2008 |
| JP | 2008-510540 A | 4/2008 |
| JP | 2008-520298 A | 6/2008 |
| JP | 2008/520298 A | 6/2008 |
| JP | 2009-511143 A | 3/2009 |
| JP | 2010-005003 A | 1/2010 |
| JP | 2010-500199 A | 1/2010 |
| JP | 2010-507418 A | 3/2010 |
| JP | 2010-516364 A | 5/2010 |
| JP | 2010-523205 A | 7/2010 |
| JP | 2010-528635 A | 8/2010 |
| JP | 2010-528737 A | 8/2010 |
| JP | 2011-530321 A | 12/2011 |
| JP | 2013-529524 A | 7/2013 |
| JP | 2013-538609 A | 10/2013 |
| JP | 2013-540475 A | 11/2013 |
| JP | 2014-504537 A | 2/2014 |
| JP | 2014-508621 A | 4/2014 |
| JP | 2014-509532 A | 4/2014 |
| JP | 2014-521442 A | 8/2014 |
| JP | 2015-085086 A | 5/2015 |
| JP | 2015-516198 A | 6/2015 |
| JP | 2017-507704 A | 3/2017 |
| JP | 2017-512082 A | 5/2017 |
| KR | 1020050107747 A | 11/2005 |
| KR | 20120114738 A | 10/2012 |
| MX | PA03011894 A | 3/2004 |
| NZ | 596919 A | 11/2013 |
| RU | 2005100732 A | 6/2006 |
| RU | 2380999 C2 | 2/2010 |
| RU | 2487067 A | 4/2012 |
| WO | 98/04460 A1 | 2/1998 |
| WO | 98/51396 A1 | 11/1998 |
| WO | 99/58035 A1 | 11/1999 |
| WO | 2001/60712 A1 | 8/2001 |
| WO | 01/64416 A1 | 9/2001 |
| WO | 01/99047 | 12/2001 |
| WO | 02/078498 A1 | 10/2002 |
| WO | 03/073896 A1 | 9/2003 |
| WO | 2004/082390 A1 | 9/2004 |
| WO | 2005/018395 A1 | 3/2005 |
| WO | 2005/044067 A1 | 5/2005 |
| WO | 2005/079638 A1 | 9/2005 |
| WO | 2006/014936 A2 | 2/2006 |
| WO | 2006/053635 A1 | 5/2006 |
| WO | 2006/121520 A2 | 11/2006 |
| WO | 2007/042414 A1 | 4/2007 |
| WO | 2007/042486 A2 | 4/2007 |
| WO | 2008/011913 A1 | 1/2008 |
| WO | 2008/090122 A2 | 7/2008 |
| WO | 2008/107645 A2 | 9/2008 |
| WO | 2008/121489 A1 | 10/2008 |
| WO | 2008/126045 A1 | 10/2008 |
| WO | 2008/132571 A1 | 11/2008 |
| WO | 2008/148646 A1 | 12/2008 |
| WO | 2009/084061 A1 | 7/2009 |
| WO | 2009/114119 A1 | 9/2009 |
| WO | 2009/115475 A1 | 9/2009 |
| WO | 2009/130311 A1 | 10/2009 |
| WO | 2009/153161 A1 | 12/2009 |
| WO | 2010/007633 A1 | 1/2010 |
| WO | 2010/013146 A3 | 4/2010 |
| WO | 2010/041179 A2 | 4/2010 |
| WO | 2010/085824 A1 | 8/2010 |
| WO | 2010/112353 A1 | 10/2010 |
| WO | 2010/118545 A2 | 10/2010 |
| WO | 2010/138563 A1 | 11/2010 |
| WO | 2010/137952 A1 | 12/2010 |
| WO | 2010/137960 A1 | 12/2010 |
| WO | 2011/000723 A2 | 1/2011 |
| WO | 2011/012501 A1 | 2/2011 |
| WO | 2011/089049 A1 | 7/2011 |
| WO | 2011/147491 A1 | 12/2011 |
| WO | 2011/147553 A1 | 12/2011 |
| WO | 2011/147591 A1 | 12/2011 |
| WO | 2012/007257 A1 | 1/2012 |
| WO | 2012/009668 A1 | 1/2012 |
| WO | 2012/010317 A1 | 1/2012 |
| WO | 2012/013556 A1 | 2/2012 |
| WO | 2012/019902 A1 | 2/2012 |
| WO | 2012/038063 A1 | 3/2012 |
| WO | 2012/080501 A1 | 6/2012 |
| WO | 2012/080928 A1 | 6/2012 |
| WO | 2012/100975 A1 | 8/2012 |
| WO | 2012/100977 A1 | 8/2012 |
| WO | 2012/104760 A1 | 8/2012 |
| WO | 2012/123106 A1 | 9/2012 |
| WO | 2012/127233 A2 | 9/2012 |
| WO | 2012/135204 A1 | 10/2012 |
| WO | 2012/174331 A1 | 12/2012 |
| WO | 2012/175985 A1 | 12/2012 |
| WO | 2013/008012 A2 | 1/2013 |
| WO | 2013/029184 A1 | 3/2013 |
| WO | 2013/032330 A1 | 3/2013 |
| WO | 2013/043048 A1 | 3/2013 |
| WO | 2013/053757 A1 | 4/2013 |
| WO | 2013/064988 A1 | 5/2013 |
| WO | 2013/136209 A1 | 9/2013 |
| WO | 2013/149354 A2 | 10/2013 |
| WO | 2013/171663 A1 | 11/2013 |
| WO | 2013/189555 A1 | 12/2013 |
| WO | 2013/189923 A1 | 12/2013 |
| WO | 2014/001563 A1 | 1/2014 |
| WO | 2014/001564 A1 | 1/2014 |
| WO | 2014/006048 A2 | 1/2014 |
| WO | 2014/007639 A1 | 1/2014 |
| WO | 2014/049143 A2 | 4/2014 |
| WO | 2014/067507 A2 | 5/2014 |
| WO | 2014/090567 A1 | 6/2014 |
| WO | 2014/102702 A1 | 7/2014 |
| WO | 2014/127863 A1 | 8/2014 |
| WO | 2014/128205 A1 | 8/2014 |
| WO | 2014/128542 A1 | 8/2014 |
| WO | 2014/131779 A1 | 9/2014 |
| WO | 2014/163497 A1 | 10/2014 |
| WO | 2012/000878 A2 | 1/2015 |
| WO | 104334473 A | 2/2015 |
| WO | 2015/028425 A2 | 3/2015 |
| WO | 2015/039258 A1 | 3/2015 |
| WO | 2015/062703 A1 | 5/2015 |
| WO | 2015/075584 A1 | 5/2015 |
| WO | 2015/107484 A1 | 7/2015 |
| WO | 2015/124619 A1 | 8/2015 |
| WO | 2015/128527 A1 | 9/2015 |
| WO | 2015/193774 A1 | 12/2015 |
| WO | WO-2016012562 A1 * | 1/2016 .......... A47J 31/3695 |
| WO | 2016/077916 A1 | 5/2016 |

(56) References Cited

FOREIGN PATENT DOCUMENTS

| | | |
|---|---|---|
| WO | 2016/174671 A1 | 11/2016 |
| WO | 2016/186493 A1 | 11/2016 |
| WO | 2016/207845 A1 | 12/2016 |

OTHER PUBLICATIONS

International Search Report and Written Opinion for International Application No. PCT/EP2016/072016, dated Nov. 11, 2016.

\* cited by examiner

ADAPTER FOR A SINGLE SERVE CAPSULE

The present invention relates to an adapter having an interior space which receives a single serve capsule, the interior space having, at a first end, an opening for introducing the single serve capsule into the interior space and, at its opposite end, a receptacle for a piercing spike.

Single serve capsules which are used to produce beverages, in particular coffee or tea beverages, often have a very different shape and/or size. In order for it to be possible nevertheless to use different single serve capsules in different machines, adapters are known to a person skilled in the art, for example from US 2015/0058331 A1, WO 2014/163497 A1 or WO 2014/128542 A1, which adapters make it possible to make different single serve capsules compatible with different coffee machines.

It was the object of the present invention to provide an improved adapter.

The object is achieved by way of an adapter having an interior space which receives a single serve capsule, the interior space having, at a first end, an opening for introducing the single serve capsule into the interior space and, at its opposite end, a receptacle for a piercing spike, it preferably being possible for the piercing spike to be connected reversibly to the receptacle.

The comments made in respect of said subject matter of the present invention likewise apply to the other subjects of the present invention, and vice versa.

The present invention relates to an adapter which is preferably provided such that it is injection molded from a plastic material. Said adapter has an interior space which receives a single serve capsule which can have a material for producing a beverage, for example a tea or coffee beverage. At one end, the interior space has an opening, through which the single serve capsule can be introduced into the interior space of the adapter. At the opposite end of the opening, a receptacle for a piercing spike is provided. Said piercing spike opens the single serve capsule at one end, in particular in the bottom region of the single serve capsule. The adapter and the single serve capsule are introduced in each case into a brewing machine and, for example, a coffee or tea beverage is produced.

The cross section of the piercing spike is preferably provided in a polygonal, in particular octagonal, manner and particularly preferably has a plurality of, in particular four, outflow channels on its outer circumference, through which outflow channels the finished beverage can run into a collecting vessel.

It is then provided according to the invention that the piercing spike can preferably be connected reversibly to the receptacle of the adapter. The embodiment according to the invention has the advantage that the piercing spike and the adapter can be separated from one another, for example for cleaning purposes. As a result the adapter according to the invention is substantially more hygienic than adapters in accordance with the prior art. Moreover, the adapter and the piercing spike can be produced from different materials.

A further subject matter of the present invention which is preferred or according to the invention relates to an adapter, in which a wall is provided between the first and the opposite end of the interior space, and said wall has a step.

The comments made in respect of said subject matter of the present invention likewise apply to the other subjects of the present invention, and vice versa.

The step is preferably arranged in the region of the wall which is provided in the vicinity of the opening for introducing the single serve capsule.

The step in the wall has the advantage that, as a result, there is an additional bearing and/or supporting edge for the single serve capsule, on which bearing and/or supporting edge the wall of the single serve capsule can be supported and/or seated. This has the advantage, in particular, that a liquid distributor which is preferably provided in the single serve capsule can be supported on the adapter via the wall of the single serve capsule.

The step is preferably adjoined by one or more ribs which are preferably provided parallel to the longitudinal extent direction of the capsule wall which extends between the capsule bottom and the collar. The ribs are preferably arranged equidistantly on the circumference of the capsule wall.

Another subject matter of the present invention which is additional or according to the invention relates to an adapter which has an outlet with at least one outlet duct at the end at which the piercing spike is provided.

The comments made in respect of said subject matter of the present invention likewise apply to the other subjects of the present invention, and vice versa.

By virtue of the fact that the outlet is situated in the region of the lower end of the adapter, in which the piercing spike is also provided, the outlet path of the finished beverage is very short, with the result that merely a low pressure loss is produced when the finished beverage runs out of the capsule into the collecting vessel.

A flow breaker is preferably provided in at least one outlet duct. Said flow breaker homogenizes the flow of the outflowing beverage, with the result that it can be dispensed in a targeted manner into a receiving vessel, for example a cup.

Furthermore, each outlet duct preferably ends in and/or on the circumference of an outlet point. The liquid flows out of the respective outlet duct at the outlet point, and is in turn guided in a targeted manner into an outlet vessel.

Furthermore, a positively locking and/or non-positively locking means is preferably provided on the receptacle and/or on the piercing spike, which positively locking and/or non-positively locking means preferably interacts in a latching manner. As a result, the piercing spike is firstly held fixedly in the receptacle; secondly, however, it can be removed from the adapter, for example for cleaning purposes, and mounted on said adapter, preferably without the use of a tool.

According to one preferred embodiment of the present invention, the adapter has a collar. By way of said collar, the adapter preferably lies on a corresponding receptacle in the brewing machine or is supported on said receptacle.

Furthermore, the adapter preferably has a bead, in particular a circular bead, in its bottom region, which bead preferably extends around the outlet of the adapter. The edge of the outlet in the bottom region of the adapter is preferably somewhat elevated in comparison with the bottom region which extends around the edge.

A further subject matter of the present invention is a system consisting of the adapter according to the invention and a single serve capsule and preferably of a coffee machine.

The comments made in respect of said subject matter of the present invention likewise apply to the other subjects of the present invention, and vice versa.

The single serve capsule has a capsule body with a wall which is preferably provided in a cylindrical or conical manner, which is adjoined by the capsule bottom. On the side which lies opposite the bottom, the capsule body has an opening, through which a filter element, the beverage raw material and possibly a liquid distributor are introduced.

After filing, said opening is covered by way of a lid film which is fastened, preferably sealed, preferably to a collar which is provided at that end of the wall which lies opposite the bottom. A stacking edge in the form of a projection is preferably provided in the wall in the region of the collar. The projection has a greater cross section, in particular a greater circular cross section, than the wall and/or the bottom.

According to one preferred embodiment of the system according to the invention, the single serve capsule has a collar which projects from one end of a wall of the single serve capsule, said collar bearing against the bearing face of the collar of the adapter.

The single serve capsule preferably has ribs which are particularly preferably provided parallel to the extent direction of the lid film. Said ribs preferably in each case have a greater cross section, in particular diameter, than the capsule wall. The ribs are preferably produced by way of deep drawing.

Furthermore, the single serve capsule preferably has a liquid distributor, the circumference of which bears against the inner side of the wall of the capsule body, the circumferential edge in the adapter supporting the wall of the single serve capsule in the region of the bearing face of the liquid distributor. The liquid distributor is particularly preferably supported at least temporarily on the projection in the capsule wan. The liquid distributor distributes the inflowing liquid via the cross section of the single serve capsule.

In order to produce a beverage, the bottom of the single serve capsule is opened by way of a piercing spike. The bottom of the single serve capsule is preferably provided in a convex manner, in particular in its central region, and preferably before being opened. The convex bulge is particularly preferably adjoined by a circularly annular bead which particularly preferably functions like a hinge. The bottom can be transformed from a convex shape into a concave shape, in particular along the bead, the bottom preferably being prestressed into the convex shape.

In order to produce a beverage, the single serve capsule is inserted into the adapter, and the piercing spike presses the single serve capsule from the convex position into a concave position. In the process or subsequently, the bottom of the single serve capsule is at least broached, preferably pierced, but, in particular, pierced only slightly. As soon as liquid is introduced into the single serve capsule, the pressure rises in the capsule. Here, the single serve capsule is at least reshaped again in the direction of its convex shape, preferably also assisted by way of the prestress of the bottom. During the reshaping, the bottom is displaced along the piercing spike, and the opening in the bottom of the single serve capsule is enlarged. The bottom particularly preferably bears against the piercing spike, but not against the contour of the groove/grooves which can be situated on the circumference of the piercing spike.

Furthermore, the brewing machine is preferably provided with a liquid nozzle which penetrates a membrane, by way of which the capsule body of the single serve capsule is closed, and through which liquid nozzle, liquid is introduced, in particular sprayed, into the single serve capsule. The nozzle is preferably configured as a cannula. The liquid nozzle preferably penetrates the membrane of the single serve capsule in its edge region.

Furthermore, the liquid nozzle preferably penetrates into the single serve capsule only to such an extent that it at most makes slight contact with the liquid distributor.

The adapter is preferably provided, in particular inserted, reversibly in a drawer of the brewing machine, which drawer can be transferred from a loading position, in which the single serve capsule can be introduced into the adapter, into a brewing position, in which the beverage, in particular the coffee beverage, is produced. During the transfer from the loading position into the brewing position, the bottom of the single serve capsule is preferably at least broached and/or the collar is pressed in the direction of the adapter, with the result that said collar bears against the adapter.

According to one preferred embodiment, the wall of the adapter which faces the single serve capsule has a profiling, for example ribs.

The single serve capsule preferably has a capsule body, in which the beverage raw material, for example the coffee powder, optionally a filter and optionally a liquid distributor are provided. The capsule body has a wall and a bottom. The wall is preferably provided in a conical manner and, at its one end, has a bottom which is provided in one piece with the wall.

A curvature radius is provided in the transition region between the wall. The wall preferably has a plurality of ribs which run, in particular, parallel to the bottom, extend over the entire circumference of the wall, and are provided equidistantly with respect to one another. The ribs have a greater diameter than the wall itself. One of these ribs, in particular the rib, which is closest to the bottom, may have a greater diameter than the other ribs. Furthermore, the wall preferably has a projection in the region of the end which lies opposite the bottom, which projection serves firstly as a stacking edge and secondly as a support for the circumferential edge in the adapter. Furthermore, a collar is preferably provided at that end of the wall which lies opposite the bottom, which collar extends parallel to the bottom and to which collar a lid film which closes the capsule body is fastened, in particular sealed. The bottom preferably has a circularly annular embossment, and the bottom very particularly preferably bulges within said embossment to the outside in the direction of the spike of the adapter. The filter is preferably fastened, in particular sealed, to the bottom, the sealing seam being provided, in particular, in a circularly annular manner, the sealing seam and the circularly annular embossment preferably having the same diameter. The internal diameter and external diameter can differ in each case, however.

The bulge in the bottom of the single serve capsule preferably extends in the region of the recess of the piercing plate. The bulge preferably has a greater, smaller or the same diameter than/as the piercing plate of the adapter.

In the following text, the inventions will be explained using FIGS. 1 to 18. Said explanations are merely by way of example and do not restrict the general concept of the invention. Said explanations apply equally to all subjects of the present invention.

Figure 12A:
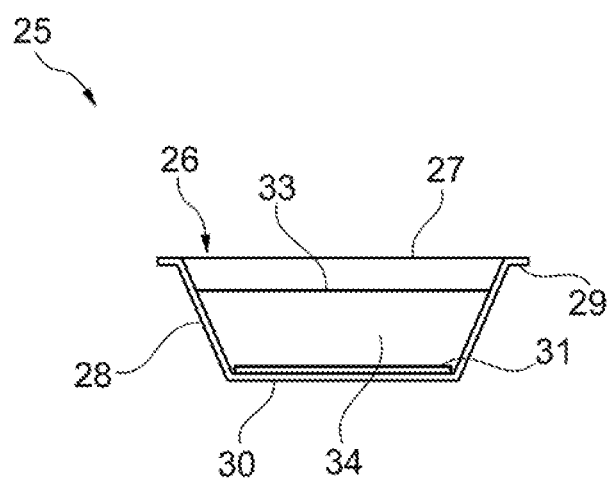
Figure 12B:
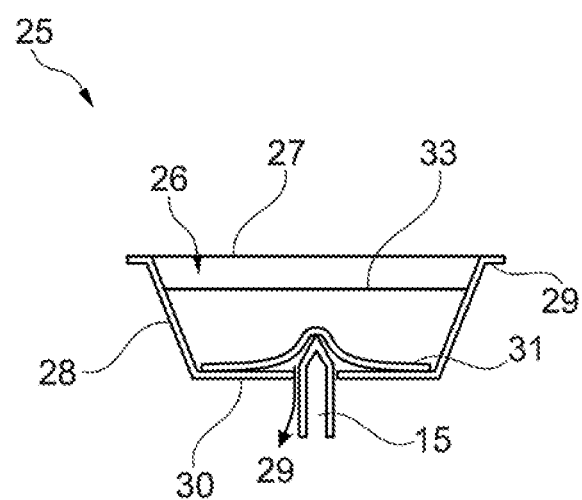

FIG. 12 diagrammatically shows one embodiment of a single serve capsule.

Figure 13:
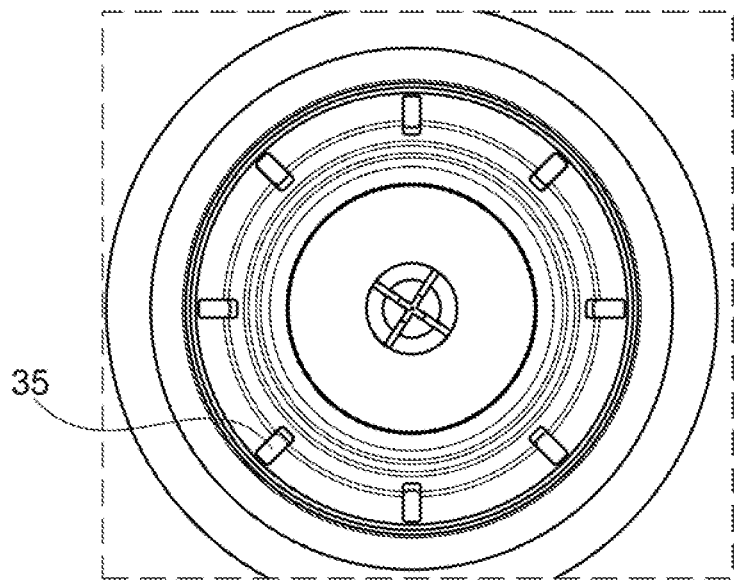
Figure 14:
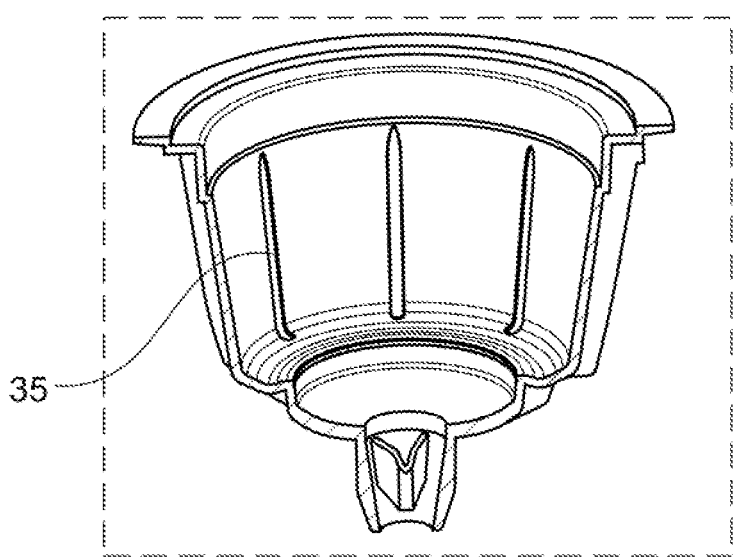
Figure 15:
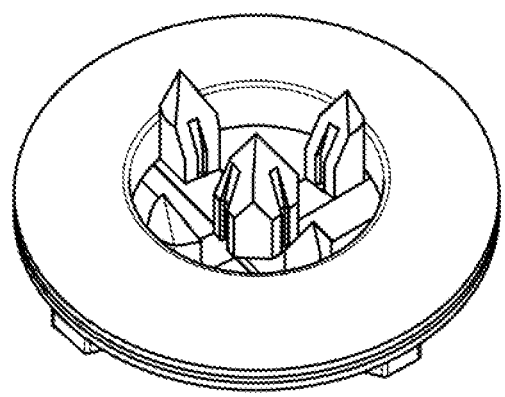
Figure 16:
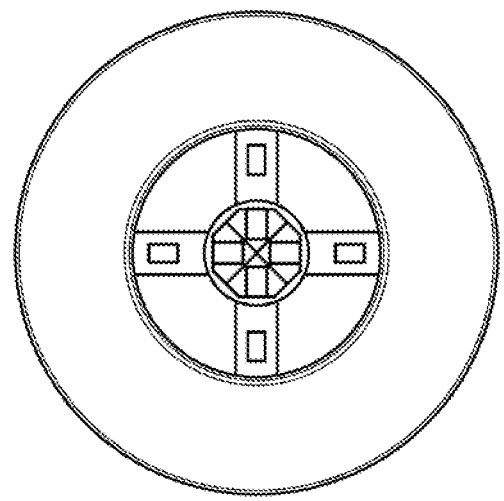
Figure 17:
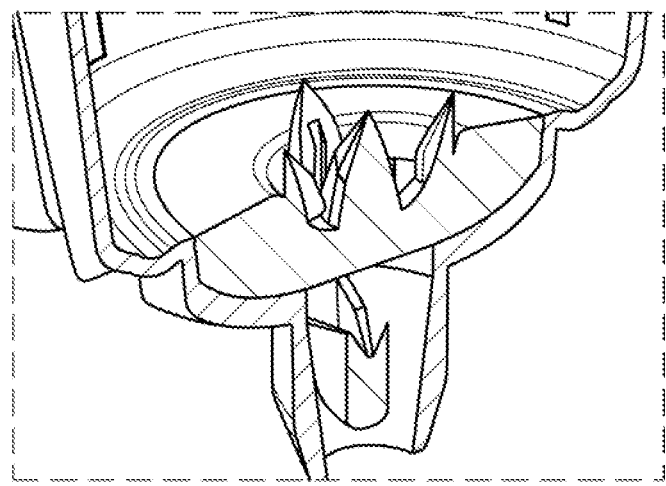
Figure 18:
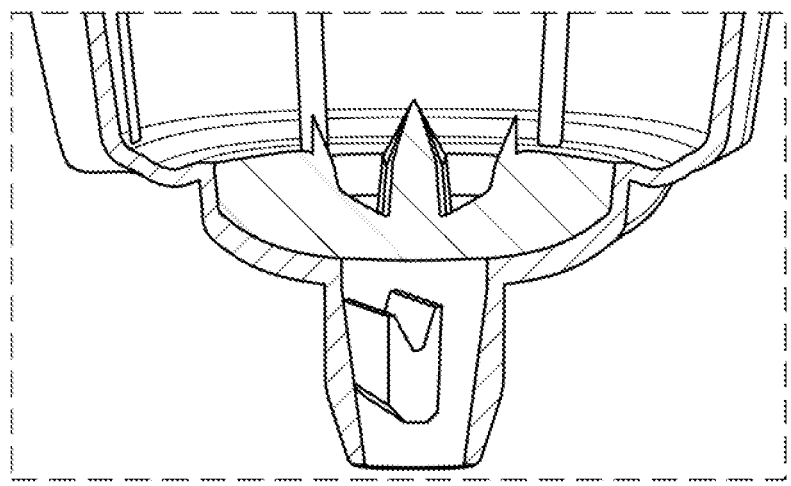

FIGS. 13 and 14 show a reinforcement in the wall of the adapter.

FIGS. 15-18 show a further embodiment of the piercing spike.

FIGS. 1 to 5 show a first embodiment of the adapter 1 according to the invention. Said adapter 1 has an interior space 2 which can receive a single serve capsule, as shown in FIG. 12, for example. The interior space has a first end 3 with an opening 4, through which the single serve capsule can be introduced into the interior space of the adapter. A receptacle 6 for a piercing spike 15 is provided at the opposite end of the opening 4, that is to say in the bottom region of the adapter. An end, in particular the bottom region of the capsule body of a single serve capsule, is pierced by way of the piercing spike 15 for the production of a beverage. For this purpose, liquid, in particular hot water, is introduced into the single serve capsule, by, for example, a membrane 27 being penetrated by a liquid nozzle 26, and dissolves and/or extracts a substance there which is required for the production of the beverage, for example a tea or coffee beverage. The beverage which is finished in this way runs along the circumference of the piercing spike into an outlet 8 which has a liquid duct 20, through which the finished beverage flows into a receiving vessel, for example a mug. The adapter preferably has a collar 10 in the region of the opening, which collar 10 projects, in particular, at a right angle from the wall 24 of the adapter. Said collar preferably serves as a bearing face for a corresponding receptacle on the brewing machine. Furthermore, the collar preferably has a bearing face, in particular a circularly annular indentation. A collar or flange 29 which is possibly provided on the single serve capsule bears against said bearing face. Furthermore, the adapter according to the invention preferably has at least one reinforcing element 11, for example in the form of webs or ribs, in particular in the region of the outer face of the wall 24. According to one subject matter of the present invention, the piercing spike 15 is preferably provided reversibly on the bottom region 5 of the adapter, with the result that it can be removed, for example, for cleaning purposes. For this purpose, both the receptacle 6 and the adapter have compatible positively locking means 7, 19, by way of which the adapter can be connected to the receptacle, in particular in a latching manner. According to a further subject matter of the present invention, a step 22 is provided in the region of the wall 24, which results in a supporting edge 21 on the inner circumference of the wall 24 of the adapter. The wall of the single serve capsule and/or a liquid distributor which is possibly provided in the single serve capsule can be supported and/or seated on said edge. According to a further subject matter of the present invention, a flow breaker 13 is provided in the liquid duct 20, which flow breaker 13 influences, in particular homogenizes, the liquid flows through the outlet duct, which ensures that the finished beverage flows into the corresponding receiving vessel. The adapter and the piercing spike are preferably in each case a plastic injection molded part, which parts are particularly preferably manufactured separately from one another and then assembled.

Figure 1:
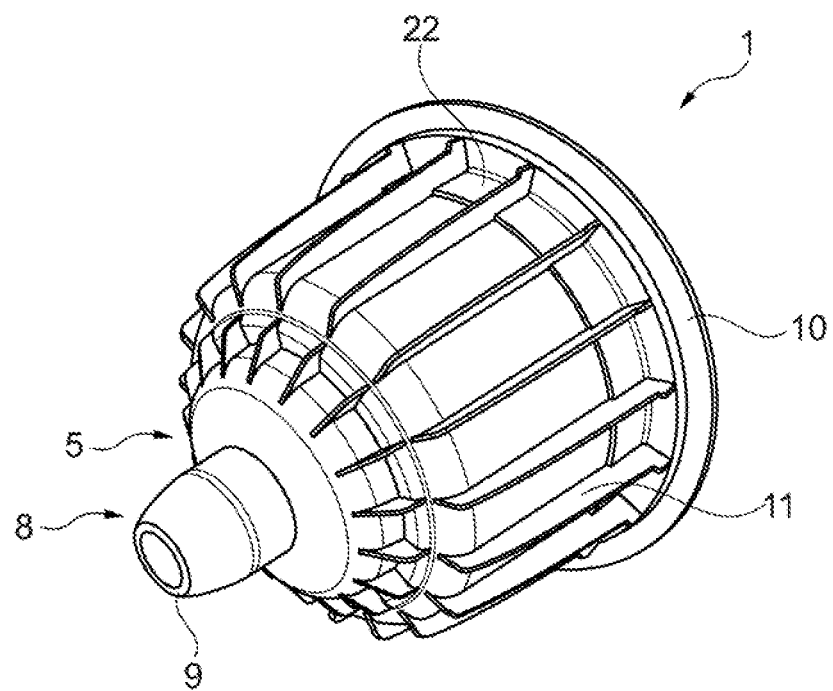
FIGS. 1 to 5 show the adapter according to the invention.
Figure 2:
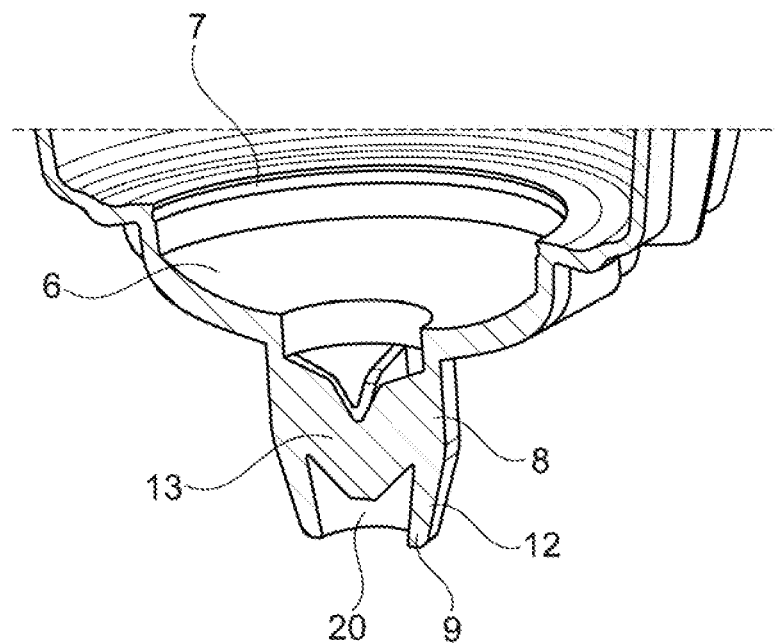
Figure 3:
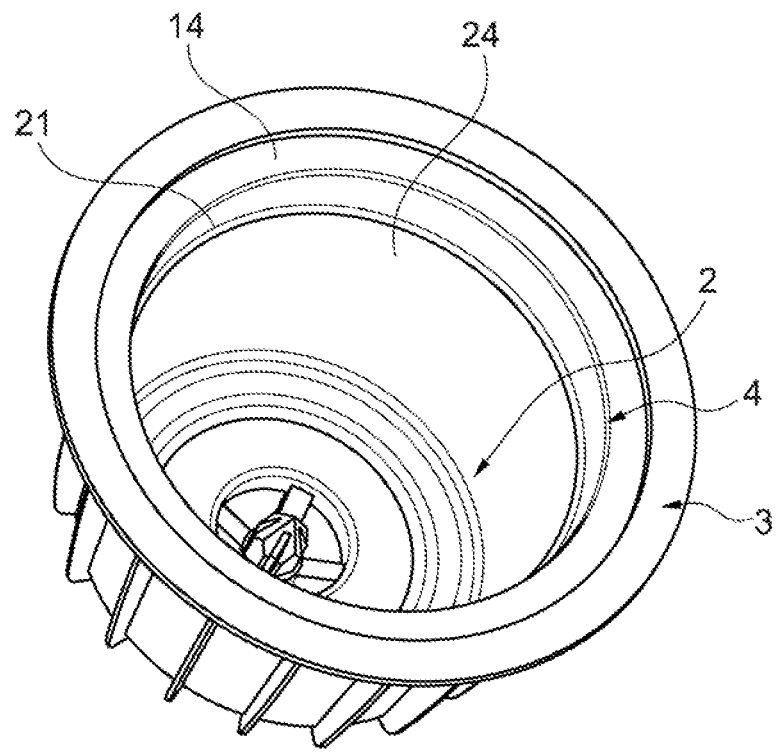
Figure 4:
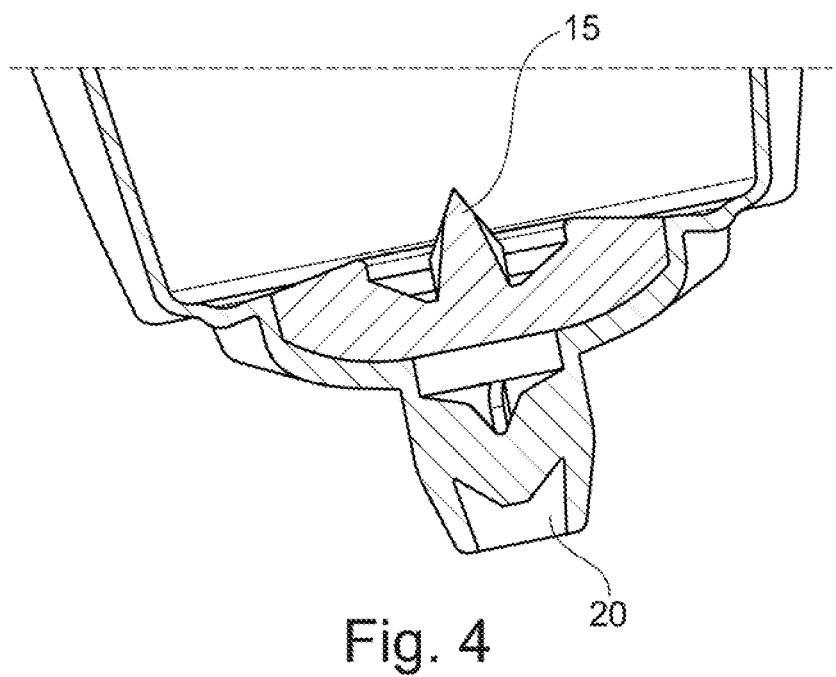
Figure 5:
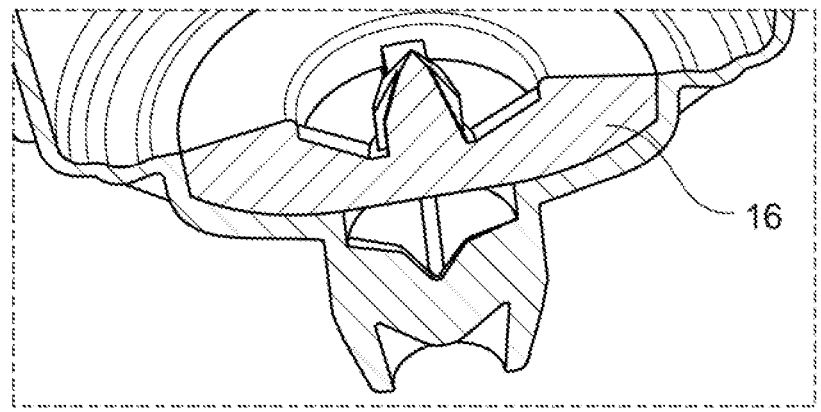
Figure 6:
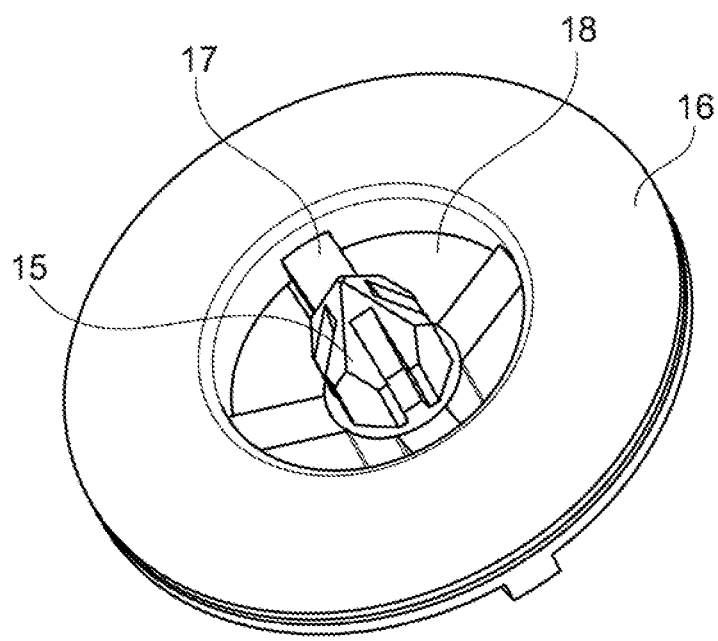
FIGS. 6 to 8 show one preferred embodiment of the piercing spike.
Figure 7:
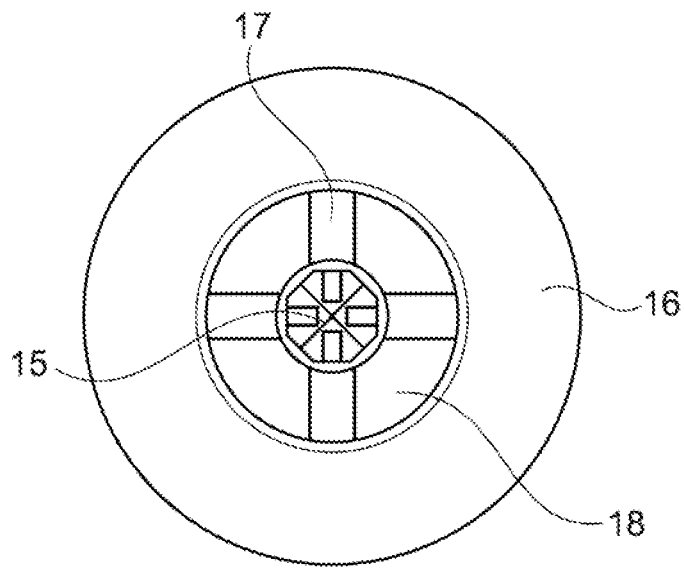
Figure 8:
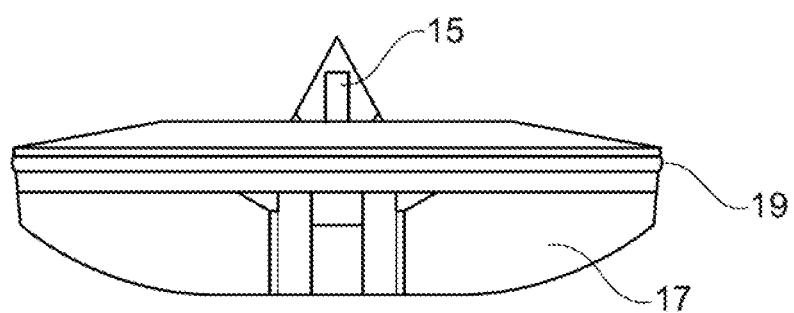

FIGS. 6 to 8 show one preferred embodiment of the piercing spike 15. In the present case, said piercing spike 15 is provided by means of webs 17 on a plate 16, on the circumference of which positively locking and/or non-positively locking means are preferably provided which interact with a complementary positively locking and/or non-positively locking means of the receptacle in the adapter in a connecting, in particular latching manner. Recesses 18 are provided between the webs. The finished beverage runs along the piercing spike through the recesses 18 into the duct 20 of the adapter and from there into the receptacle of the beverage, for example into a mug.

Figure 9:
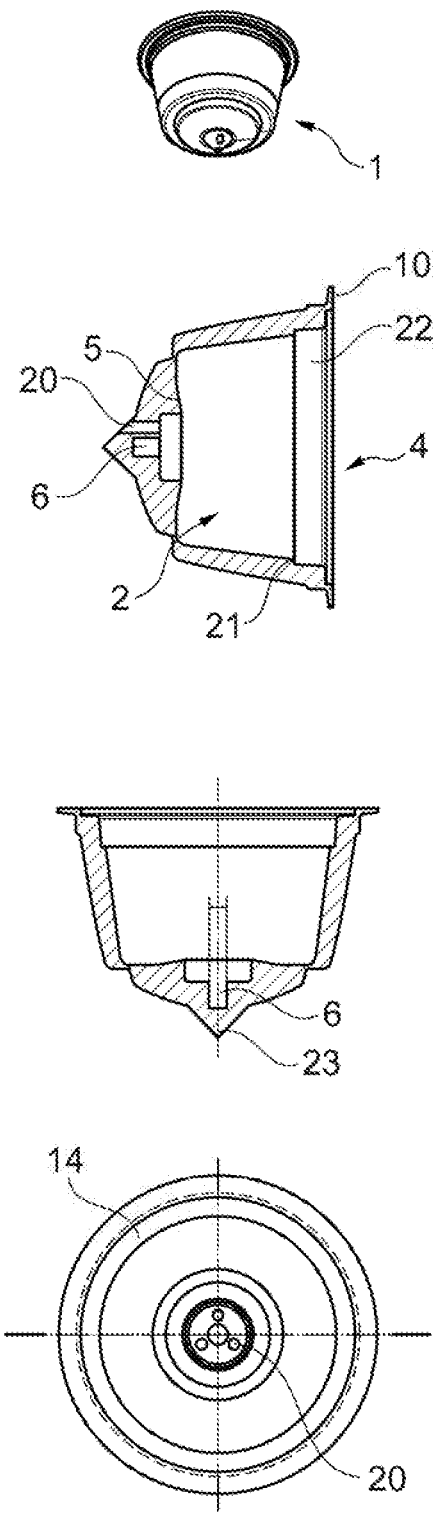
FIGS. 9 to 11 show in each case one preferred embodiment of the adapter.

FIG. 9 shows a further embodiment of the adapter according to the invention. Reference can be made substantially to the comments in respect of the preceding figures. In the present case, the adapter is shown with a receptacle 6, and a plurality of (here, shown as three) liquid ducts 20 are provided in the bottom region 5 of the adapter, which liquid ducts 20 end in each case in the edge region of an outlet point 21. The liquid runs through the respective outlet duct to the outlet point 21 and from there into a receiving vessel. The outlet point ensures that the liquid runs at least substantially as a jet into the receptacle.

Figure 10:
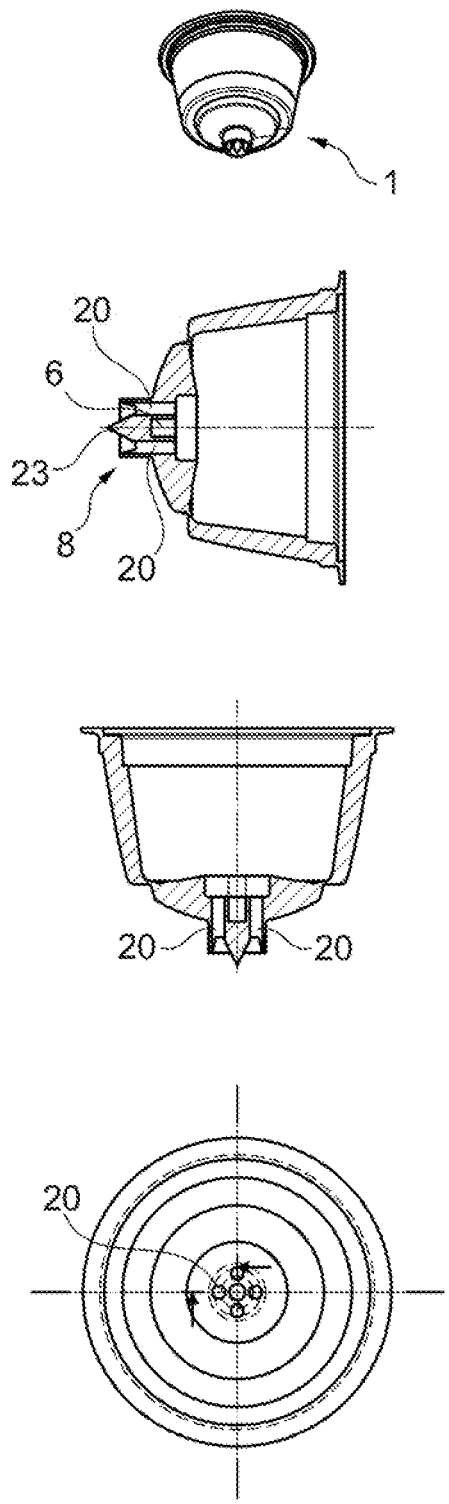

FIG. 10 shows a further embodiment of the adapter according to the invention, reference once again being made to the comments in respect of the preceding figures. In the present case, the bottom region of the adapter has four outlet ducts 20 which once again end in the region of an outlet point 23. The liquid runs in each case through the ducts 20 and around the outlet point 23 into a corresponding receptacle.

Figure 11:
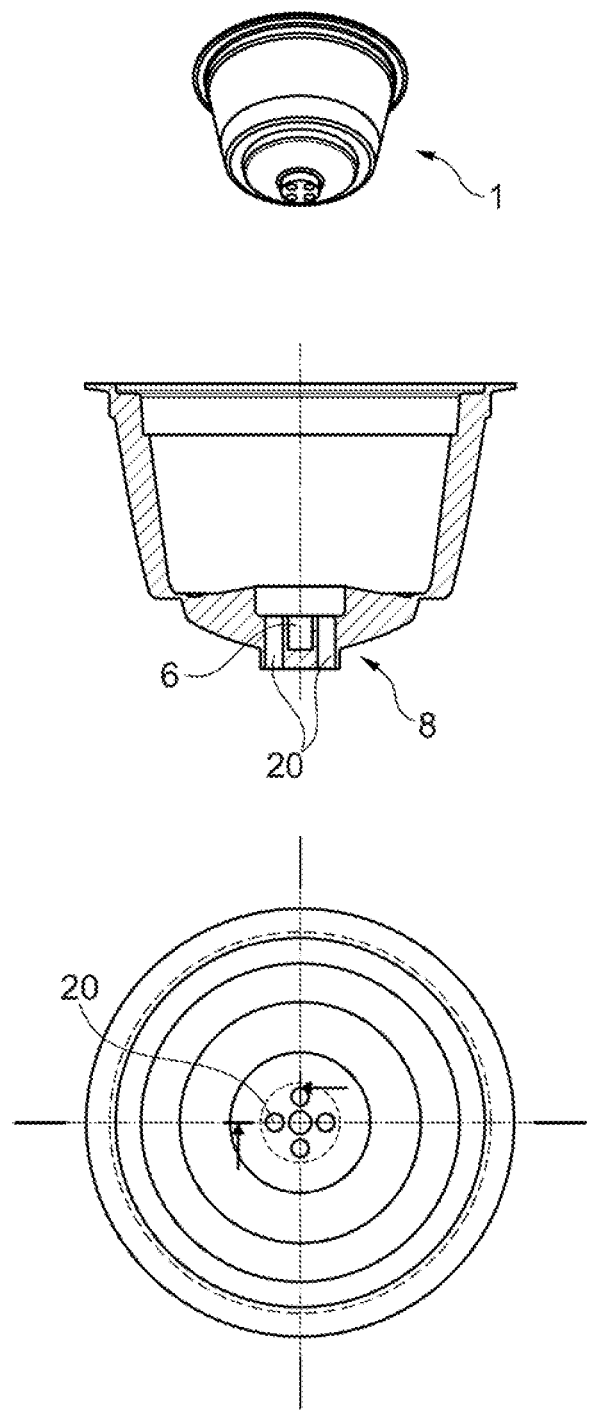

FIG. 11 shows a further embodiment of the adapter according to the invention, reference being made, in particular, to the comments according to FIG. 10. In the present case, the outlet point 23 has been omitted. The liquid runs out of the ducts 20 directly into the corresponding receptacle, for example a mug.

FIG. 12 shows one embodiment of a single serve capsule 25 which can be introduced into the interior space of the adapter 1. Said single serve capsule has a capsule body 28 with a bottom region 30. The wall and the bottom form an interior space which can receive a beverage substrate, for example tea or coffee granules which is/are dissolved and/or extracted by water which flows through. In the present case, a filter element 31 is provided in the bottom region, which filter element 31 is preferably provided in the form of a nonwoven or a felt and is connected, in particular, to the capsule bottom, for example by way of welding, in particular by way of ultrasonic welding. The capsule body is closed by way of a membrane 27 which is connected, for example, to a collar or flange 29 of the capsule body. A liquid distributor 33 which distributes the inflowing liquid over the cross section of the single serve capsule is preferably provided between the membrane and the beverage substrate.

FIG. 12 a shows the single serve capsule in the unopened state.

FIG. 12 b shows the single serve capsule in the open state, that is to say during the production of the respective beverage. In order that the single serve capsule can be flowed through by way of a liquid, in particular hot water, the membrane is broached by a nozzle 26 (as symbolized by way of the arrow) which protrudes into the interior space of the single serve capsule and injects liquid into it. For example, the nozzle 26 can be configured as a cannula. In order that the finished beverage can flow out of the single serve capsule, said single serve capsule is broached by means of an above-described piercing spike 15 in the region of the bottom 30. Here, as shown, the filter element 31 can be lifted out by the piercing spike. A person skilled in the art recognizes that this does not necessarily have to be the case, however. As shown by way of the arrow 29, the finished beverage flows through an intermediate space between the capsule bottom and the piercing spike into the outlet duct 20. According to one preferred embodiment, the single serve capsule has a liquid distributor 33 which is supported on the wall of the single serve capsule and which can possibly be provided such that it can be displaced along the capsule wall. Said liquid distributor is preferably supported by way of the edge 21 which is provided on the adapter wall 24.

FIGS. 13 and 14 show one preferred embodiment of the adapter, in which reinforcements 35 are provided on the inner side of the adapter, which reinforcements 35 firstly increase the stability of the adapter, but possibly also provide additional guidance and/or support for the single serve capsule.

FIGS. 15-18 show a further embodiment of the piercing spike. Reference is made substantially to the comments according to FIGS. 5-8, the piercing spike in the present case having, in addition to the point in the center, further (here, four) additional points which can penetrate into the bottom of the capsule. As a result, the capsule is pierced at a plurality of locations on the bottom, and the finished beverage can flow out at a plurality of locations. In the present case, the additional points are arranged on a circle, the center of which lies at the center of the middle piercing spike. The additional points are preferably arranged equidistantly. A person skilled in the art understands that the number of additional points can also be lower. The central point can optionally also be dispensed with.

LIST OF DESIGNATIONS

1 Adapter
2 Interior space
3 First end
4 Opening
5 Second end, opposite end, bottom region
6 Receptacle for a piercing spike
7 Positively locking and/or non-positively locking means, latching edge
8 Outlet
9 Outlet edge
10 Collar, bearing face on the coffee machine
11 Reinforcing element, rib
12 Tapered portion
13 Flow breaker
14 Bearing face for the collar of the single serve capsule
15 Piercing spike
16 Piercing plate
17 Web
18 Recess
19 Positively locking and/or non-positively locking means
20 Liquid duct
21 Circumferential edge
22 Step, bulge
23 Outlet point
24 Wall
25 Single serve capsule
26 Injection nozzle
27 Lid film
28 Capsule body
29 Collar, flange
30 Capsule bottom
31 Filter element
32 Outlet of the liquid from the single serve capsule
33 Liquid distributor
34 Beverage substance, tea, coffee, etc.
35 Reinforcement

The invention claimed is:

1. An adapter comprising:
an interior space, adapted to receive a single serve capsule having a capsule body and lid, where the capsule body and lid are each formed of a non-filter material, the interior space having, at a first end, an opening for introducing the single serve capsule into the interior space and, at its opposite end, a piercing spike and a receptacle for the piercing spike,
wherein the piercing spike can be connected reversibly to the receptacle, and
wherein the piercing spike is provided on webs on a plate, on a circumference of which a locking means is provided which interacts with a complementary locking means of the receptacle in a connecting manner,
wherein the adapter is adapted to be placed into a brewing chamber of a coffee brewing machine, and
wherein the adapter includes one or more reinforcing elements to stiffen the adapter and ease removal of the single serve capsule from the brewing chamber.

2. The adapter as claimed in claim 1, wherein a wall is provided between the first end and the opposite end, and the wall has a step.

3. The adapter as claimed in claim 1, wherein, at the opposite end, the adapter has an outlet with at least one outlet duct.

4. The adapter as claimed in claim 3, wherein a flow breaker is provided in at least one outlet duct.

5. The adapter as claimed in claim 3, wherein the adapter comprises an outlet point and the at least one outlet duct ends in and/or on a circumference of the outlet point.

6. The adapter as claimed in claim 1, wherein the locking means is provided on the receptacle and/or on the piercing spike, which locking means interact in a latching manner by a groove and lip engagement.

7. The adapter as claimed in claim 1, wherein a collar is provided at the first end.

8. A system comprising: the adapter as claimed in claim 1, a single serve capsule, and a coffee machine.

9. The system as claimed in claim 8, wherein the single serve capsule has a collar, which projects from one end of a wall of the single serve capsule, and the collar bears against a bearing face of the collar of the adapter.

10. The system as claimed in claim 8, wherein the single serve capsule has a liquid distributor, which bears against a wall of the capsule body, a circumferential edge in the adapter supporting the wall in the region of a bearing face of the liquid distributor.

11. The system as claimed in claim 8, wherein the coffee machine has a liquid nozzle, which punctures a membrane, by way of which the capsule body of the single serve capsule is closed, and introduces liquid into the single serve capsule.

12. The system as claimed in claim 11, wherein the liquid nozzle is provided in an edge region of the membrane.

13. The system as claimed in claim 11, wherein the liquid nozzle does not make contact with a water distributor.

14. A system consisting of the adapter as claimed in claim 1, a single serve capsule, and a coffee machine.

15. An adapter comprising:
an interior space, adapted to receive a single serve capsule having a capsule body and lid, where the capsule body and lid are each formed of a non-filter material, the interior space having a first end and an opposing end,
wherein the first end comprises an opening for introducing the single serve capsule into the interior space and a collar, and the opposing end comprises a piercing spike, a receptacle for the piercing spike and an outlet with at least one outlet duct,
wherein the piercing spike is connected reversibly to the receptacle,
wherein the piercing spike is provided on webs on a plate, on a circumference of which a locking means is provided which interacts with a complementary locking means on the receptacle,
wherein a wall is provided between the first end and the opposing end, the wall comprises a step,
wherein a flow breaker is provided in at least one outlet duct, wherein the adapter comprises an outlet point and at least one outlet duct ends in and/or on a circumference of the outlet point, wherein the adapter is adapted to be placed into a brewing chamber of a coffee brewing machine, and wherein the adapter includes one or more reinforcing elements to stiffen the adapter and ease removal of the single serve capsule from the brewing chamber.

16. A system comprising: the adapter as claimed in claim 15, a single serve capsule, and a coffee machine, wherein the single serve capsule comprises a collar, which projects from one end of a wall of the single serve capsule, the collar bears against a bearing face of the collar of the adapter, wherein the single serve capsule comprises a liquid distributor, which bears against the wall of the capsule body, wherein the coffee machine comprises a liquid nozzle, which punctures a membrane at an edge region of the membrane, and introduces liquid into the single serve capsule, and wherein the liquid nozzle does not make contact with a water distributor.

* * * * *